Oct. 7, 1969      R. N. ELY      3,471,197
PASSENGER RESTRAINING SYSTEM
Filed March 20, 1967      3 Sheets-Sheet 1
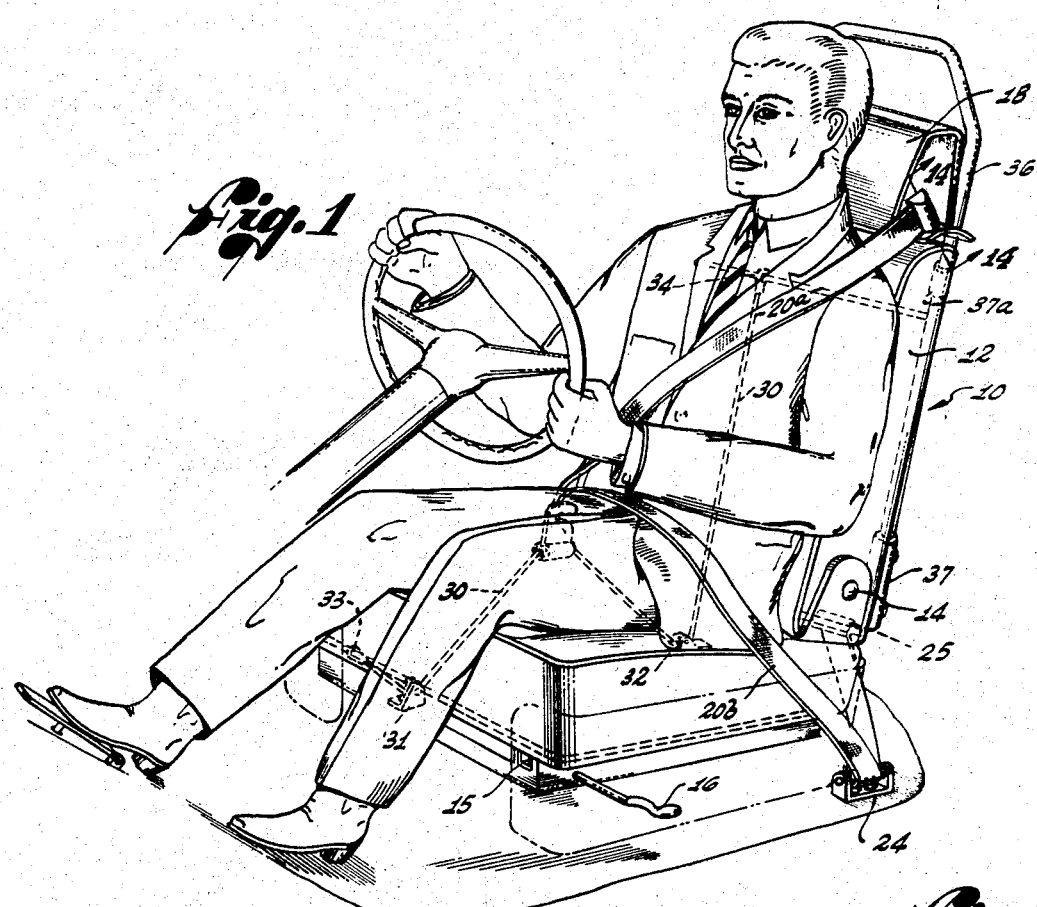
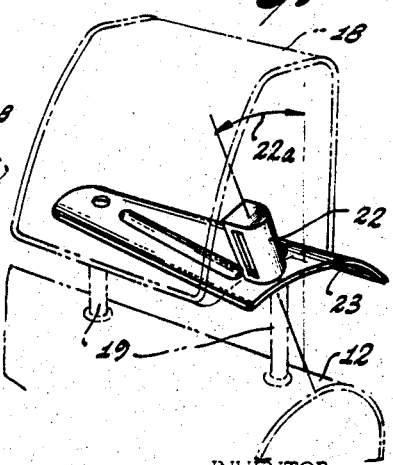
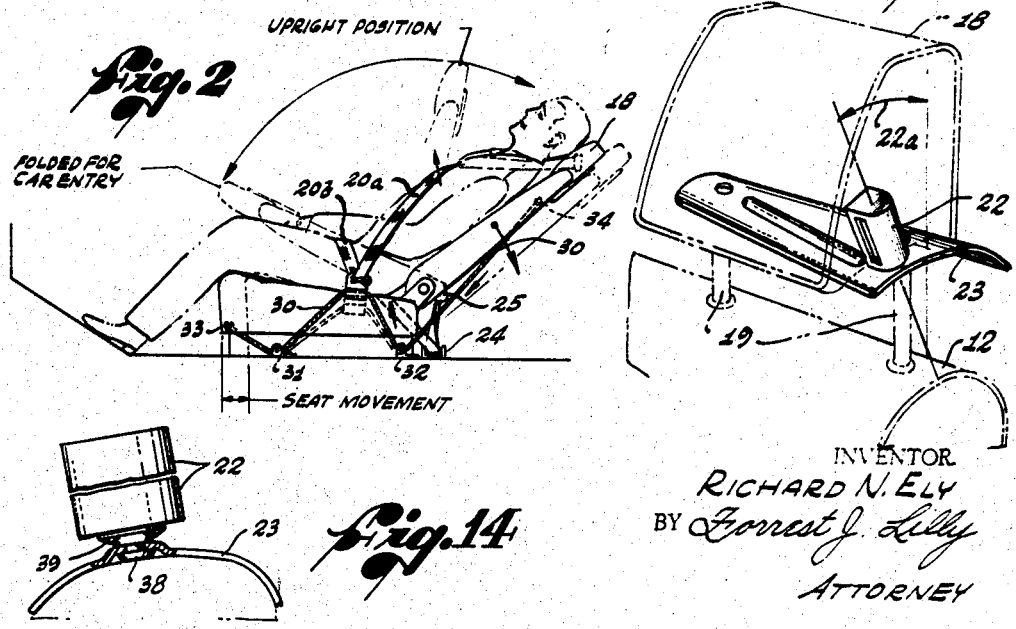
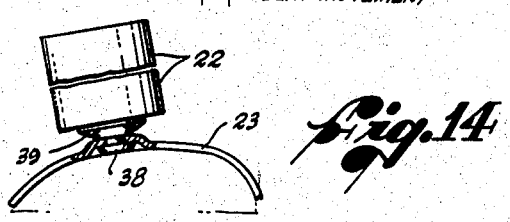
INVENTOR.
RICHARD N. ELY
BY Forrest J. Lilly
ATTORNEY Oct. 7, 1969       R. N. ELY       3,471,197
PASSENGER RESTRAINING SYSTEM
Filed March 20, 1967                3 Sheets-Sheet 2
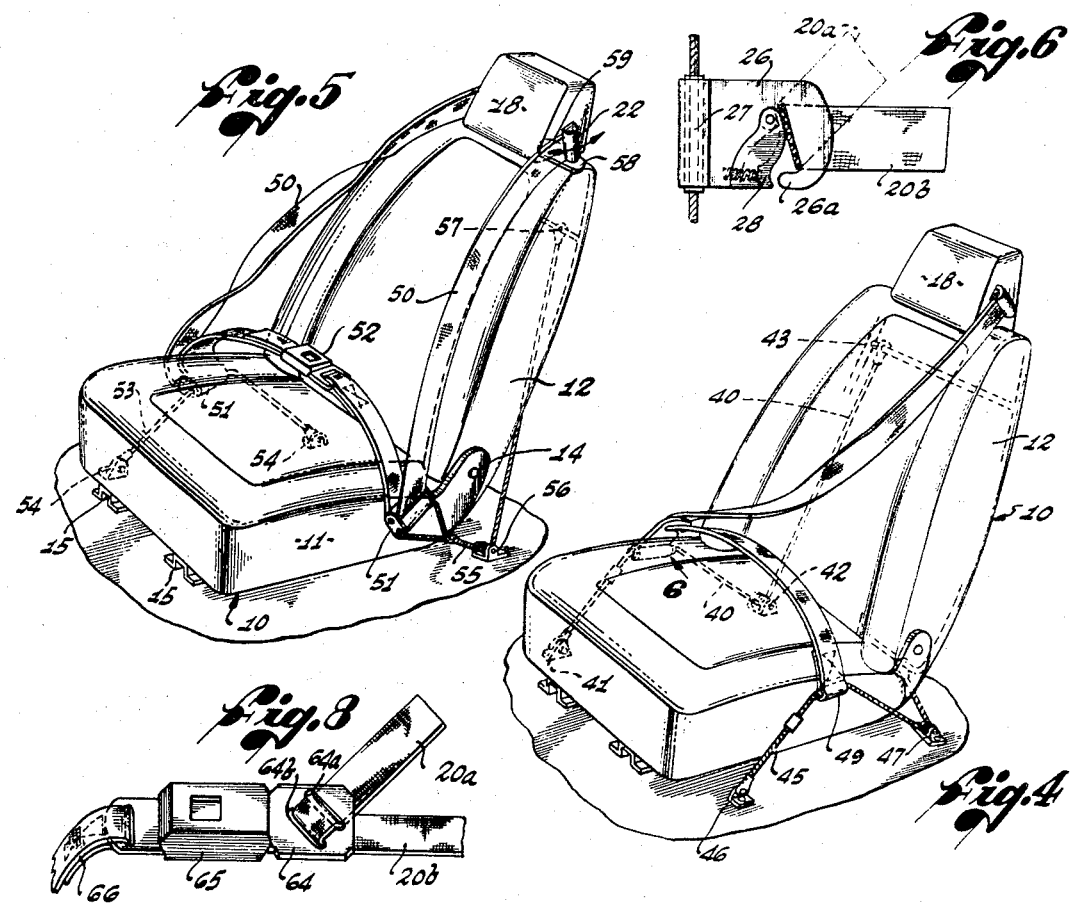
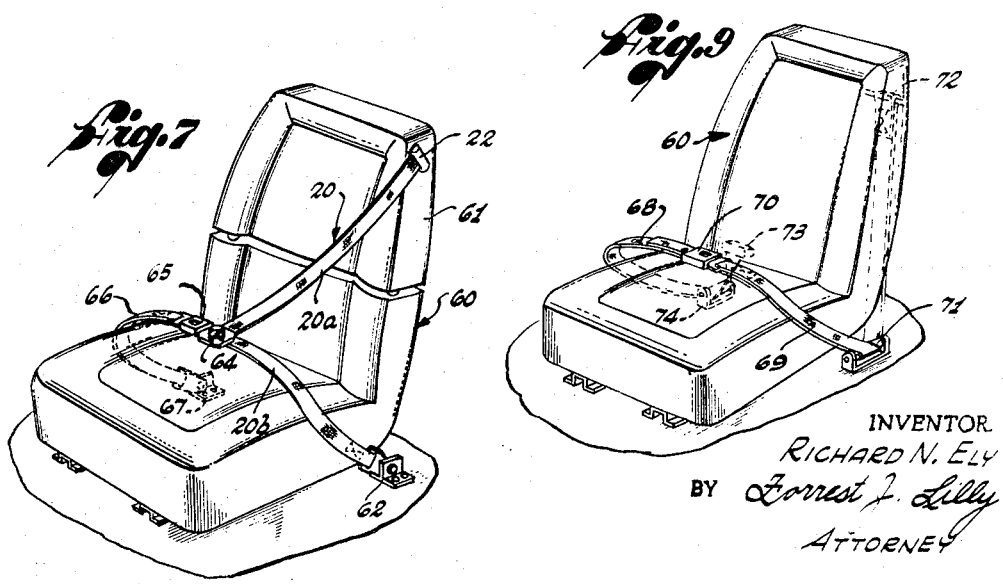
INVENTOR.
RICHARD N. ELY
BY Forrest J. Lilly
ATTORNEY

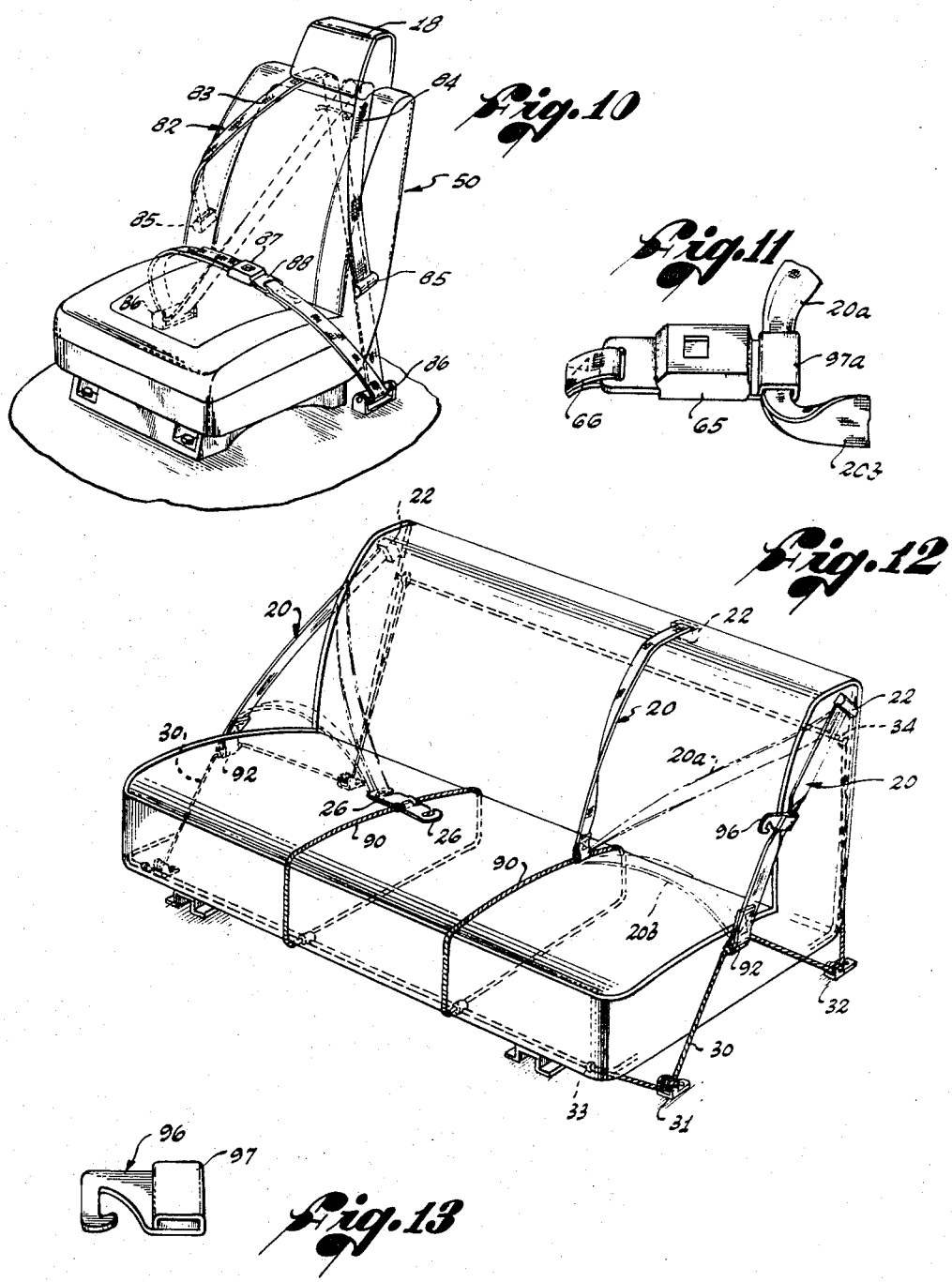

United States Patent Office 3,471,197
Patented Oct. 7, 1969

3,471,197
PASSENGER RESTRAINING SYSTEM
Richard N. Ely, 11901 Sunset Blvd.,
Los Angeles, Calif. 90049
Filed Mar. 20, 1967, Ser. No. 624,264
Int. Cl. B60r 21/10; A62b 35/00
U.S. Cl. 297—385          27 Claims

ABSTRACT OF THE DISCLOSURE

One or more straps holding an occupant in a vehicle seat, are arranged to transfer to the seat forces derived from the kinetic energy of a passenger pressing forwardly against the straps during sudden deceleration of the vehicle. These forces on the seat are directed to prevent the seat from moving upward or forward relative to the vehicle body, thereby increasing the safety of the seat, especially when the seat is movable or adjustable, as in an automobile. The forces on the seat are in directions to oppose upward or forward movement of the seat during sudden deceleration, thereby compensating for inherent structural weakness in the mounting or construction of a movable seat or the tendency of the tilting or reclining back of a seat to jackknife forwardly during a crash.

Background of the invention

The problem of eliminating or minimizing injury to passengers in an airplane, automobile, or other vehicle when the vehicle collides with another vehicle or is subjected to sudden impact against some fixed object, is not a new problem. The present invention relates generally to a system for restraining passengers seated in a vehicle to eliminate or reduce injuries sustained by them as a direct consequence of violent contact with the interior of a vehicle, the so-called second collision. As a direct result of accidental collision or sudden impact, the inertia of the passengers tends to move them forward in the vehicle; and the problem is to restrain them safely against sufficient movement in the vehicle to injure them by contact with interior of the vehicle.

The present restraining system is specially designed for automobiles, but is not limited thereto. Because it has many advantages that are particularly apparent when the system is applied to passenger automobiles, the invention is disclosed in that aspect; but it is to be understood that such disclosure is not intended to constitute a limitation upon the application of the invention.

In most modern automobiles, the driver's seat is adjustable, at least to some extent. A simple construction is that in which the seat is mounted upon rails for movement forwards and backwards relative to the vehicle in order to change the position with respect to the driving controls. Many current models of cars contain a more complex seat mounting arrangement which adds vertical movement as well as a tilting movement in order to better accommodate drivers of various physical characteristics and to contribute to their comfort.

In order to obtain movements of the character, the front seat or seats of an automobile are mounted on the floor of the vehicle by mechanism which adjusts or moves the seat and which is inherently unable to hold the seat firmly in place under the loads imposed by a sudden deceleration during accidents. Recognition is given to this condition by the requirement that seat belts be fastened to bolts on the floor of the vehicle, or preferably, attached to the frame. This arrangement, of course, transfers the load on the restraining straps or belts directly to the vehicle but provides no restraint on the seat; and under some conditions, the tendency of the seat itself to move forward, or the back of a folding seat to pivot forwardly, can injure the passenger. In any event, the passenger is safer when the seat is prevented from moving forward as a result of a crash.

In some vehicles, especially in aircraft, seat belts are attached to the seat rather than to the floor or directly to the vehicle. This, of course, would be satisfactory if the seat were strongly enough anchored to the body; but this is not a satisfactory solution of the problem when the seat is adjustably mounted on the floor, as in modern automobiles, because the mechanism for adjustably moving the seat is not strong enuogh to constitute an adequate anchor system. Also, this affords no solution to the problem of preventing forward pivotal movement of a forwardly folding seat back or with rearwardly reclining seats. While current automobile models are provided with latches to hold the back of the seat from pivoting forward, this safety feature can only be incorporated at the factory on cars made in the future and a solution to this problem is required for cars that have already been manufactured and sold. Currently, seat back latches are required only to withstand the kinetic energy of the back itself in a crash and thus do not permit the anchorage of passenger restraint systems to the seat backs.

Accordingly, it is a general object of the present invention to provide a restraining means for a passenger that utilizes the kinetic energy of the passenger during a crash to increase the safety of the passenger against injury as a consequence of sudden deceleration of the vehicle.

More particularly, it is an object of the invention to provide restraining means utilizing the kinetic energy of the passenger through means as well as the passenger more securely to the vehicle, while at the same time leaving the seat free for such movement of adjustment as is normally available for the convenience or comfort of the passenger.

It is also an object of the invention to provide an improved restraining system which is adapted to seats which are movably mounted on the floor of the vehicle in order to increase their safety.

A further object of the invention is to provide an improved restraining system which prevents forward pivotal movement of the back of a folding seat as a consequence of sudden deceleration of the car, while still leaving the seat free to pivot when the restraining means is not in use.

A further object of the invention is to provide an improved restraining system which affords maximum comfort and convenience to the passenger, coupled with maximum safety, in order to induce frequent or continuous use of the restraining means.

A still further object in the present invention is to provide a simplified restraining means which provides increased effectiveness and safety for the passenger with minimum cost for the system.

Summary of the invention

A passenger restraining system achieving the above objects and designed for a passenger seated in a seat mounted on the floor of the vehicle, comprises strap means passing in front of the passenger to restrain the passenger against movement out of the seat during rapid deceleration of the vehicle. Anchor means are provided connecting the strap means to the vehicle, such anchor means including guide means mounted on the floor of the vehicle and flexible means extending from the strap means through the guide to a connection to the seat. The flexible member may be an extension to the strap means itself passing through a guide on the floor or the strap means may be attached to a more complex anchor means including a flexible cable, a connector slidable on the cable for connecting the strap means to the cable and means coupling the cable to the vehicle at two or more spaced positions. These coupling means may be either guides on the floor of the vehicle through which the cable passes to a connection to the seat or means at the ends of the cable, such as eye bolts. Beyond the guides, the runs of the cable are then extended upwardly for attachment to the seat, preferably one at the front of the seat and the other to the back.

The flexible members attached to the seat are designed to exert a downward and/or rearward pull on the seat as a whole as well as the seat back in response to the force exerted on the strap means and a consequent pull on the flexible member resulting from forward movement of the passenger out of the seat.

The strap means preferably includes a member which is roughly the equivalent of the familiar lap belt extending across the thighs of the individuals; and preferably also includes a member extending upwardly across the upper torso of the passenger to an anchor point above and rearwardly of one shoulder. This top anchor for the strap means is typically at the top of the back of the seat. In a preferred embodiment, the seat has a portion which moves up and down for adjustment, as for example the familiar head rest; and the anchor means is attached to this vertically adjustable portion of the seat in order that it is adjustable with the height of the seated passenger. In this way, the strap across the upper torso is maintained at the optimum position with respect to the passenger, a position that is controlled basically by the height of the shoulder of the passenger.

Stabilization of the seat back in the manner just described makes possible a second feature of this invention which is the location of an upper anchor, or anchors, for a passenger restraint system on or in the seat back, even though it be designed to fold forward and/or recline backward; or to locate such anchor in a head rest as a part of such seat back. The location of anchors in or upon a folding seat back; or on a head rest mounted on such a seat; is a distinctly new approach to the problem of anchoring upper torso restraint harnesses since heretofore it has been necessary to anchor such harnesses either to the vehicle on a door post, or the roof structure; the only other alternative being an anchor incorporated in a rigid, extra-strong seat.

Having created structures composed of firstly, an arrangement of webbing and cable, to make a folding and reclining seat into a temporarily rigid and extraordinarily strong unit and secondly, an upper anchor system for a restraint harness, this invention goes on to include the provision of new and special harness arrangements and accessory fittings.

A further safety device may also be added to the back of a seat which has been strengthened by the utilization of the kinetic forces generated in a crash; namely, a roll-bar structure made of tubular steel to protect the driver and/or passengers in the front seat of a car which might otherwise offer them little or no protection in the event of a turn-over. Such a roll-bar attached to a folding seat back folds forward to permit access to rear seats when the harness is not fastened around the seat occupant, but is held rigidly upright by the downward and rearward forces of the attached harness during rapid deceleration in a crash.

Description of the drawings

How the above objects and advantages of the present invention are attained will be more readily understood from reference to the following description, and to the annexed drawing, in which:

FIG. 1 is a front and side perspective view of a preferred embodiment of the present invention, showing an installation on the driver's seat of a vehicle.

FIG. 2 is a side elevation of restraining means similar to that illustrated in FIG. 1 installed on the front seat in a vehicle beside the driver, illustrating the freedom of movement of the tilting back of the seat.

FIG. 3 is a perspective view of a base plate and take-up reel mounted thereon constituting an anchor for strap means applicable to a seat having a head rest.

FIG. 4 is a front and side perspective of a seat of an automobile illustrating another embodiment of the present invention characterized by a single continuous strap extending across the lap and the upper torso of the passenger.

FIG. 5 is a front and side perspective of an automobile seat illustrating a variational embodiment of the invention.

FIG. 6 is a fragmentary plan view of the connection of the single strap of FIG. 4 with a hook for connection to cable-type anchor means secured to the floor.

FIG. 7 is a front and side perspective of another embodiment of the present invention illustrating a single continuous strap attached to a different form of seat having a vertically adjustable section.

FIG. 8 is a fragmentary plan view of a tongue and buckle as a variational form of connection between the continuous strap of FIG. 7 and one side anchor to the floor.

FIG. 9 is a front and side perspective of another embodiment of the invention in which the strap means are extended through floor guides for connection to the seat back.

FIG. 10 is a front and side perspective of variational embodiment of the present invention applied to a fixed seat with two shoulder straps attached at one end to the seat back.

FIG. 11 is a fragmentary plan view of variational form of tongue and buckle connection between a continuous strap and anchor means.

FIG. 12 is a front and side perspective of another embodiment of the invention showing application thereof to a bench seat in an automobile adapted to restrain three passengers.

FIG. 13 is a perspective view of a novel design for a hook used, as for example, in the embodiment of FIG. 12.

FIG. 14 is a fragmentary section on line 14—14 of FIG. 1.

Description of preferred embodiments of the invention

Referring now to the drawing, and particularly to FIG. 1, there is shown therein a vehicle seat indicated generally at 10 occupied by passenger P. Seat structure 10 comprises a horizontally extending bottom seat portion 11 to which back 12 is pivotally connected at 14. This is a common type of construction found in cars having only two doors, the seat back tilting forward to permit access to the back seat of the automobile.

Seat 10 is mounted upon the floor of the vehicle, for example an automobile, by mechanism, not shown in the drawings, which permits the seat to be adjusted in position, at least by movement from front to rear. This type of motion is accomplished by travel along a pair of rails 15 to which the seat is normally coupled by a releasable latch mechanism, the latch mechanism being released by operation of handle 16. Since the means for movably mounting the seat and the latch mechanism are all structures well known in the art, disclosure in detail of this mechanism is not essential to a comprehension of the present invention.

Back 12 of the seat is here shown as provided with head rest 18 which is mounted on posts 19 and is adjustable vertically. The head rest is sometimes provided as an accessory, but is often part of the original seat structure and is designed to prevent whip-lash injuries when the car is struck from the rear. Functionally, it is merely an extension of the seat back upwardly in order to support the head of the passenger. Accordingly, for purposes of disclosure, the head rest is considered herein as being broadly part of the back of the seat which is capable of vertical adjustment in position in order to accommodate it better to passengers of different heights since it should be high enough to afford support to the passenger's head while at the same time not being any higher than required in order not to impair visibility to the rear.

Passing in front of the passenger P in order to restrain him against forward movement out of the seat because of and during rapid deceleration of the vehicle, is strap means indicated generally at 20. In this embodiment of the invention, the strap means 20 comprises a single continuous length of flexible webbing or other strap material which may conveniently be considered as being divided into two runs. The upper run 20a extends from a point above and rearwardly of one shoulder of the passenger diagonally across the chest to a point over, or at one side of, the thigh on the opposite side of the body. This upper run 20a serves as a restraint for the upper torso to hold the upper part of the body from pivoting forwardly around the hips. The lower run 20b of the strap means extends from the end of the upper run in a more or less horizontal direction across the thighs and then downwardly at the opposite side of the passenger to an anchor point, being generally located and arranged in a manner comparable to the familiar lap belt.

The installation shown in FIG. 1 is that preferred for the driver of the vehicle, assuming a left-hand drive vehicle as is common practice. The arrangement illustrated is selected because, as will become apparent, the restraining system thus provides a minimum of inconvenience to passengers entering and leaving the cars. The arrangement in FIG. 2 is arranged similarly to the installation in FIG. 1, but is that for the passenger riding in the left hand front seat beside the driver, the two installations being similar but of opposite hand.

Anchor means are provided connecting strap means 20 to the vehicle. As seen in both FIGS. 1 and 2, the anchor means consists of elements which connect the strap means to the vehicle at several positions. The top anchor at the upper end or diagonal run 20a is anchor means 22 which preferably is in the form of an inertia reel. A mechanism of this type is well known in the industry and accordingly needs no detailed description here. It may be described briefly, in general, as providing a spring-driven reel upon which the strap 20 is wound when slack and which yieldingly allows the strap to be withdrawn from the housing. Inertia operated locking means are provided which engage the strap and hold it firmly when the strap is jerked. It will be realized that such anchor means are merely preferred from the standpoint of convenience and any other suitable means may be provided, such as a swivel or an eye bolt.

The upper anchor comprising the upper inertia reel 22 is preferably attached to base plate 23 which is shown in detail in FIG. 3. This base plate 23 may conveniently be curved in cross section to conform to the top of the seat back 12 and the bottom of heat rest 18. As a suitable and convenient means for attaching the base plate 22 on the seat at the underside of the head rest 18, the base plate is provided with a plurality of openings through which pass the posts 19. The posts mount the head rest on the seat back 18 in a slidable manner, so that the elevation of head rest 18 may be adjusted as desired, and also transmit to the seat back any pull on the reel 22 by the strap means 20.

Although alternatively the upper anchor location may be at a fixed elevation, as by anchoring it to a fixed head rest or other fixed portion of the seat back, it is preferred to attach it to the vertically adjustable portion 18 of the seat back in order that the anchor point can be adjusted to an optimum position with respect to the passenger using the restraining system.

The lower anchor point for the lower end of run 20b is a guide 24 which is attached to the floor of the vehicle at the same side of the seat 10 as that at which the upper reel 22 is located. Run 20b passes through guide 24 and then extends upwardly to a point of connection 25 on the folding back 12 of the seat. Point 25 is rearwardly of pivot 14.

As shown in FIGS. 1 and 2, strap 20 is engaged intermediate its ends by hook 26 which serves not only to connect the strap 20 to the anchor means at an intermediate point, but also to change the direction of the strap at the junction between the upper and lower runs 20a and 20b respectively.

Hook 26 is illustrated in greater detail in FIG. 6. In its simplest form, the hook has an open side through which strap 20 passes to engage the hook. A fixed guard 26a holds the strap against disengagement, as also does the wedging effect obtained by pushing the strap into the narrow throat at the end of the strap receiving slot in the hook. The strap 20 slides freely within the hook to obtain automatic adjustment of the lengths of runs 20a and 20b, as the hook determines the dividing point between them. A spring-urged latch plate 28 may be added if desired to hold the strap more securely in the hook and also to restrain the hook from sliding along the strap.

Hook 20 serves as a connector between other elements of the anchor means and the strap means. For this purpose, hook 20 is movably mounted by slide 27 on cable 30 which passes through fixed guides 31 and 32 attached to the floor of the vehicle. These guides serve as one form of means for coupling the cable to the vehicle. After passing through forward guide 31, the cable extends upwardly and forwardly to a point of connection 33 with the seat, preferably near the front of the seat. After passing through the rearward guide 32, cable 30 extends upwardly to a point of connection 34 with the seat on back 12 thereof, point 34 being above and rearwardly of pivot 14.

The anchor means comprising cable 30 and guides 31 and 32 are located on the side of the seat opposite reel 22. The cable is preferably located on the inside of the seat in order to provide maximum freedom of egress and ingress to the vehicle. At the same time, the invention is not limited to location of a specific anchor means on a specific side of the passenger.

Connection 34 at the upper end of the cable to the seat is on a frame member of the seat designed to withstand crash stresses. It is preferably high up on the seat back for reasons which will become more apparent; but in the broader aspect of the invention, is not limited in any particular location on the seat back. It will be apparent from inspection of FIG. 2 that the anchor means, in particular cable 30, does not interfere with tilting movement of seat back 12. When the restraining system is not in use, there is no pull on cable 30 and the seat back 12 is free to pivot through its full range of normal movement. Even when in use with a passenger seated therein, the seat back is free to swing between a normal upright position (dotted lines) and a rearward position (full lines) in which the passenger is reclining. Guide 24 is below and more or less directly beneath pivot 14; but this anchor point can be moved rearwardly if desired in a reasonable range of movement. In these positions, the movement of the tilting seat back does not require any change in the adjustment of the restraining system, particularly, with the normal range of movement of the strap provided by inertia reel 22.

A change in position of hook 26 between the extreme positions of the seat back is indicated in dotted lines in FIG. 2; and this range of movement will indicate that the anchor means illustrated easily accommodates tilting or vertical movement of the seat for adjustment of position. In FIG. 2, the seat is shown at the both rearward and forward positions of horizontal movement along rails 15, the corresponding positions of cable 30 being shown in dotted and full lines respectively. Thus, it will be seen that the anchor means accommodates a full range of movement of the seat or its back at all times, even when the seat is occupied.

In the event of a collision or other accident causing sudden deceleration of the vehicle, the inertia of the passenger throws the passenger forward against strap means 20 which restrains the passenger against forward movement out of seat 10. As the strap means decelerates the passenger tension is developed in the strap 20; and forces in reaction to the pull on strap means 20 are exerted at all anchor points. The pull on hook 26 creates tension in cable 30; and this tension in the cable is transmitted to the vehicle floor at 31 and 32 and applies a pull on connections 33 and 34 to the seat. The pull in the cable on connection 33 is directed rearwardly and downwardly while the pull on the seat at 34 is mainly downwardly. The tension in the cable is resisted by the vehicle floor at the guides 31 and 32. Similarly, the pull of strap 20 on anchor 22 has a downward component on the seat as does the pull on the seat at 25. The strap also pulls on the vehicle floor at guide 24. The pull by either cable 30 or strap means 20 applied to seat 10 is in a direction to hold the seat down and also against forward movement.

Thus, the mechanism mounting the seat on the vehicle floor for the various adjusting movements described above, is not required to be strong enough to take the strain of holding the seat in position in the vehicle. Furthermore, the forces developed holding the seat in place against forward movement increase with an increase in the rate of deceleration of the vehicle or an increase in the kinetic energy of the passenger pressing against the strap means. At the same time, the normal movement of the seat for convenience adjustment in no way is interfered with. Also, the stress in the system required to arrest the forward movement of the passenger is transmitted directly to the vehicle floor or frame through coupling points 24, 31 and 32 while the forces ultimately imposed on the seat structure by the anchor means tend to hold it in place rather than to pull it loose from mounting on the vehicle.

Thus, it can be seen that the kinetic energy of the passenger which is absorbed by the restraining system is utilized to develop forces applied to the seat which stabilize the seat in position independently of the mounting means which ordinarily supports the seat on the floor of the vehicle. This stability of position is not only imparted to the lower portion of the seat to prevent it from moving forward, but also to the upright back to prevent it from swinging forward during rapid deceleration. This stabilization in position of the seat back in particular can be utilized to advantage by providing the seat back with a roll-bar 36 as shown in FIG. 1. While the roll-bar may take any desired configuration, it is shown here in a typical form as involving a generally U-shaped tubular member of which the open ends are seated in sockets 37 attached to the back of seat back 12. Additional clamps 37a may be provided as desired to secure the roll-bar to the seat back frame. Without a stabilizing force on the seat back such as is provided by the pull of cable 30 and also by the strap at connection 25, the seat back may not be in a position to effectively protect the passenger in the event the car turns over. Moreover, centrifugal forces (in a rollover) on passengers wearing kinetic harnesses would also be channeled into downward and rearward forces on the seat and attached roll-bar tending to hold both rigidly in place.

The disposition of upper run 20a of the strap means where it passes over the shoulder of the passenger is of importance in eliminating injury to the passenger from the strap means. For this reason, it is preferred that the housing of reel 22 be mounted on base plate 23 as shown in FIG. 3 with the flat side of the webbing facing the passenger's neck and the axis of the reel upright and tilted forwardly from the vertical by some angle such as is shown at 22a. Thus, the axis of the reel is substantially perpendicular to the direction that the strap takes as it leaves the reel housing.

The mounting of reel 22 is preferably a pivotally mounting as shown in FIG. 14. In this case, the reel is mounted to turn about its axis on pivot pin 38. A spring (Belleville) washer 39 may advantageously be inserted between base plate 23 and reel housing 22. This swivel connection of the reel to the base plate allows the housing to turn about pivot 38 in the event that the passenger is thrown laterally agains the webbing. This swivel motion of the anchor at the upper end of strap means 20a improves the effectiveness of the strap means in restraining the passenger and reduces the possibility of injury.

Description of modified forms of the invention

Various modifications within the scope of the present invention are possible, one of which is illustrated in FIG. 4. In this arrangement, the upper anchor 22 is mounted within or upon head rest 18, omitting base plate 23.

The anchor means on the far side of the seat is generally similar to the cable arrangement illustrated in FIG. 2, except for the omission of a forward connection of the cable to the seat at 33. In this arrangement, the cable 40 is secured to the floor of the vehicle at the forward fixture 41 and then passes through a rearward guide 42, after which the cable goes upwardly to a point of connection 43 with the frame structure of pivoted seat back 12 in the manner previously described.

The anchor means on the near side of the seat is similar as it has the ends of cable 45 anchored directly to the floor of the vehicle by forward bracket 46. The cable passes rearwardly through guide 47 to a connection with the seat back at 48. Thus, the anchor means is coupled to the vehicle directly at 46 and 47 located at two spaced position on the floor. Since cable anchor means is provided at both sides of the seat, the lower end of horizontal run 20b of the strap means is provided with a slidable connection to the cable at 49, which connection is movable along cable 45 in order to accommodate adjusting movement of the seat, as previously described.

A further modification in both the strap means and in the anchor means is illustrated in FIG. 5. Here, the strap means passing in front of the passenger comprises two separate lengths of flexible strap 50. Each length of strap 50 is connected at the upper end by anchor means 22 to head rest 18, constituting the vertically adjustable portion of the back of the seat. Straps 50 then pass downwardly in a more or less vertical direction, thereby forming a pair of loops which pass forwardly of the shoulders of the passenger. These loops then pass through roller guides 51 and upwardly, thence horizontally across the thighs of the passenger, in the manner of the familiar lap belt. The two lower free ends of the two straps 50 are releasably connected by a tongue and buckle 52, which may be of any well known construction.

On the far side of the seat, the anchor means comprises a cable 53 anchored forwardly and rearwardly at 54 to the floor of the vehicle. Roller guide 51 is slidably mounted on cable 53 in the manner described in connection with FIG. 4.

On the near side of the seat, the anchor means comprises cable 55 which is connected at one end to roller guide 51 and then passes downwardly to and through guide 56 mounted in a fixed position on the floor of the vehicle. After passing through guide 56, cable 55 extends upwardly to a point of connection at 57 with the frame structure of pivoted seat back 12 in the manner previously described.

A variational form of swivel mounting for the upper anchor 22 is illustrated in FIG. 5. In this embodiment, the inertia reel is non-rotatably mounted upon plate 58 which projects laterally beyond head rest 18, the plate being in turn pivotaly mounted at 59 to the underside of the head rest to travel up and down with it and to allow the reel to swing about pivot 59 to accommodate the reel to a changing direction of pull on the anchor. This arrangement exemplifies a mounting in which reel 22 is mounted to swivel about an axis beyond the reel housing.

FIG. 7 illustrates application of the invention to a seat 60 with a rigid back (i.e., not folding) which is divided horizontally more or less centrally of the back. Thus, seat 60 is provided with a fixed back of which the upper portion 61 is vertically adjustable in position. Strap means 20 is a single continuous member constructed and arranged essentially as described in connection with FIGS. 1 and 4. The upper anchor point 22 is directly to the upper seat portion 61, base plate 23 being omitted.

The anchor means in this embodiment of the invention has been modified somewhat in that the anchor means on the near side is a swivel connection 62 on the vehicle floor, the inertia reel 22 being omitted at this location. Hook 26 is now replaced by a tongue and buckle construction as shown in detail on FIG. 8. Tongue 64 has a flat blade provided with a pair of slots 64a and 64b through which strap 20 passes at the junction of upper run 20a and horizontal run 20b. The two slots are preferred as a means for permitting sliding adjustment of the blade along the strap means when slack while at the same time providing means for holding the blade in any adjusted position. The relative lengths of runs 20a and 20b can be easily adjusted as desired by a passenger while the blade resists movement when the strap is in tension. Blade 64 has a tongue which is releasably held in buckle 65, such buckle being of any suitable construction. The anchor means for buckle 65 comprises a short strap section 66 which is anchored to the floor on the far side of the seat 60 by swivel connection 67. By moving blade 64 along strap 20 to adjust the relative length of runs 20a and 20b, the user can easily locate the buckle at the side of the body or near the hip or nearer the center of the body, as desired. Strap 64 and lower run 20b of the continuous strap together constitute the general equivalent of a lap belt anchored at its ends directly to the floor, while at the same time, run 20b is a part of the continuous strap which extends to the upper anchor point 22 from anchor 62.

FIG. 9 illustrates another application of the restraining system to a seat 60 with a fixed back. In this system, the strap means comprises a pair of flexible straps 68 and 69 which are joined together at their free lower ends by a tongue and buckle 70 so that adjoining portions of the belt pass more or less horizontally over the thighs of the passenger and secure the passenger in place in the seat. Strap 69 passes through roller guide 71 mounted on the floor beside the seat and hence, upwardly to a point of connection 72 with the frame structure of the seat back. Thus, the upward run of the belt between guide 71 and connection 72 is located to exert a pull on the back of the seat in a manner similar to the correspondingly located run of cable 30 of FIG. 1.

Strap 68 extends from buckle 70 downwardly towards the other side of the seat and hence through a second roller guide 74 mounted on the far side of the seat and up to a second anchor point on the back of the seat at 73. This may be a fixed anchor point or it may be an inertia reel; either of which transmits kinetic energy from the passenger to the seat in a downward direction. The portions of straps 68 and 69 beyond guides 71 and 74, constitute flexible members in extension of the strap means which actually engage and restrain the passenger. Such extensions are connected to seat in the manner of the anchor means previously described. Consequently, these extensions are equivalent to the corresponding elements of anchor means in other forms of the invention, though integral with the strap means restraining the passenger.

The invention has so far been described as applied to a seat which is movably mounted upon the vehicle floor. This is because the reinforcing or stabilizing action of the passenger restraining means has a particularly advantageous application to movably mounted seats. However, in its broader aspect, the invention is independent of the manner in which the seat is mouned; and any of the forms of the invention so far described may be applied to a fixed seat.

FIG. 10 illustrates a fixed seat 80 which is anchored to the floor of the vehicle by bolts 81. The restraining means 82 includes the two straps 83 and 84 that are anchored at one end to the seat back at 85. From this anchor point each strap extends upwardly and under head rest 18, a vertically movable portion of the seat back. From the top of the seat back, each strap 83 and 84 comes downwardly, the two straps crossing each other behind the seat, to the opposite side of the seat. Each strap 83 and 84 then passes through a floor mounted roller guide 86, from which the strap extends upwardly to pass over the lap of the seated passenger. One free end of a strap 83 and 84 has a buckle 87 while the free end of the other strap carries a tongue 88 which can be releasably connected to the buckle in order to pass over the thighs in the manner of the seat belt.

Reels at 85 retract each of the straps. Pulling each strap from a reel provides a pair of more or less vertically extending shoulder loops for upper torso restraint. Roller guides 86 are as far back of seat 50 as practical to gain an advantageous direction of pull on the straps passing through to hold down seat 50.

The strap means in FIG. 10 is illustrative of the application of the invention to a fixed seat, the advantage being that the pull exerted on the seat in a downward or rearward direction adds strength to the fastenings 81 and additionally stabilizes the position of the seat. The arrangement is particularly useful in aircraft where the seats are anchored directly to the floor; but fastenings 81 are not always strong enough to resist the suddenly applied loads imposed upon the seats in the event of a crash.

FIG. 12 illustrates the application of the present invention to a bench type seat having a fixed back such as is commonly found in passenger cars having four doors. Since the seat of this type is wide enough to accommodate three people, the restraining system illustrated in one which is adapted for use by as many as three individual passengers. The basic unit of the strap means is the single continuous strap 20 as illustrated in FIG. 1. Each strap 20 is anchored at its upper end at 22, preferably in a retraction device so that when not in use, a single strap occupies the full line position of FIG. 12. In use, each strap is pulled out of the retraction device and occupies a position shown in broken lines, thus providing the upper run 20a and the lower horizontal extending run 20b in the manner previously described.

The lower end of the strap at the right in FIG. 12 is slidably connected at 92 to cable 30 which passes through two spaced floor guides 31 and 32, the forward end of the cable being anchored to the seat at a fixed point 33 and the other end of the cable being anchored to the seat back at a fixed point 34.

Hook 96 may be formed in the same manner as hook 26 illustrated in FIG. 6; but a variational form of hook may also be used as illustrated at the right in FIG. 12 and more particularly in FIG. 13. In this structure hook 96 has a rectangular tubular portion 97 which is open at both ends and through which strap 20 passes as shown in FIG. 12. Tubular section 97 is of a size and shape designed to receive the strap with a sliding fit when the strap is folded on itself along a median line and the double thickness then passed through the tubular section 97. The longer dimension of the rectangular tubular section 97 is generally in the direction of the plane of the hook 96. Consequently, when the hook is attached to cable 90, the lower run 20b of the strap means leaves hook 96 by bending rather sharply away from the hook (see FIG. 11) in the direction of the longer dimension of the opening in the tubular section. This arrangement has the advantage that the hook slides easily and freely upon the strap when not in use; but when the strap is in operative position, the sharp bend in the strap provides a great resistance to the hook sliding downwardly along the strap under any loads imposed on the strap means during a vehicle crash.

Since hook 96 cannot be anchored beyond the seat as in the case of individual seats illustrated previously, the anchor means for hook 96 here comprises a cable 90 which passes around rigid structural members of the seat or is in any other way anchored to seat frame members. The hook is slidably connected to cable 90 so that it can be moved forward or backward along the cable for adjustment as previously described.

A duplicate restraining system comprising strap means 20 and anchor means 90 as just described, but using hook 26 and of the opposite hand, is located at the far end of the seat structure shown in FIG. 12. Strap means 20 at the left end of the seat, as viewed in FIG. 12, is anchored at its upper end to an inertia reel 22 and its lower end through sliding connector 92 to a cable 30, in the same manner as is described at the right hand end of the seat. In use, the strap is engaged by hook 26 slidable along cable 90.

FIG. 11 illustrates a modification of the tongue and buckle connector of FIG. 8 to provide for attachment to the strap means using the tubular section 97 illustrated in FIG. 6. Here, the tongue-engaging buckle 65 is provided with a flattened tubular section 97a through which the strap means passes at the junction of tongues 20a and 20b as shown in FIG. 11. This provides for adjustability of the point of connection along the continuous strap 20.

The passenger occupying the center of the seat uses the center strap means 20 which is anchored at its upper end by a retraction device 22 carried on the seat. This strap is engageable with a hook 26 slidably mounted on one of the cables 90. The lower end of strap 20, since it cannot be carried beyond the side of the seat and anchored directly to the vehicle frame, is slidably connected to the other cable 90. Thus, the two cables 90 provide anchor means at one side of each of the two passenger restraining systems.

From the foregoing description, it will be apparent that various changes in the detailed construction and arrangement of the individual elements constituting the present invention, may occur to persons skilled in the art without departing from the spirit and scope of the invention. Accordingly, it is to be understood that the foregoing description is considered as being illustrative of, rather than limitative upon, the invention as disclosed herein.

I claim:

1. A passenger restraining system for a passenger seated in a seat mounted on the floor of a vehicle, comprising:
   strap means passing in front of the passenger to restrain the passenger against movement out of the seat during rapid deceleration of the vehicle;
   and means connecting the strap means to the vehicle including
   guide means mounted on the floor of the vehicle;
   and flexible means extending through the guide means connecting the strap means to the seat, whereby forward pressure by the passenger against the strap means creates a restraining pull on the seat.

2. A passenger restraining system as in claim 1 which also includes
   anchor means connecting the strap means to the seat at a location rearwardly of the passenger.

3. A passenger restraining system as in claim 1 in which guide means are mounted on the floor of the vehicle at each of two opposite sides of the seat, and a flexible member at each side of the seat extends through a guide means and is connected to the back of the seat.

4. A passenger restraining system as in claim 1 which, on at least one side of the seat, also includes
   a second guide means mounted on the floor of the vehicle;
   and a flexible member extending from the strap means through the second guide means to a connection on the seat near the front thereof, whereby forward pressure by the passenger on the strap means creates a second restraining pull on the seat.

5. Anchor means for a passenger restraining system for a passenger seated in a seat in a vehicle, said seat having a head rest on the back thereof, comprising:
   a base plate adapted for attachment to the head rest in a generally horizontal position with a portion of the base plate extending laterally beyond the head rest,
   and strap connecting means on the projecting portion of the plate,
   said head rest being mounted on the back by a plurality of posts for vertical adjustment to a selected position, and said posts passing through the base plate to transmit loads thereon to the seat back.

6. Anchor means for a passenger restraining system for a passenger seated in a seat in a vehicle, said seat having a back, comprising:
   a head rest;
   means mounting the head rest on the back of said seat for vertical adjustment relative to the seated passenger;
   and strap connecting means mounted on the head rest and adjustable vertically therewith, forces imposed on the head rest by the strap connecting means being transmitted by the mounting means to the seat back.

7. The combination of:
   a seat in a vehicle having a pivotally connected folding back;
   a passenger restraining system engaging a passenger seated in the seat to decelerate the passenger during rapid deceleration of the vehicle;
   and means connecting the restraining system to the seat back to exert thereon a stabilizing force having a downward component, said force being derived from the force exerted against the restraining system by the passenger during deceleration.

8. The combination as in claim 7 which also includes
   a head rest on the seat back;
   and anchor means on the head rest connecting the restraining system to the head rest.

9. The combination as in claim 8 in which the anchor means includes a swivel-type connection between the head rest and the restraining system to permit elements of the restraining system to change angular position in the event of lateral movement of the passenger.

10. A passenger restraining system for a passenger seated in a seat mounted on the floor of a vehicle, comprising:
    strap means passing in front of the passenger to restrain against movement out of the seat during rapid deceleration of the vehicle;
    and anchor means connecting the strap means to the vehicle, said anchor means including
    a flexible cable,
    a slidable connector movable along the cable for connecting the strap means to the cable,
    and means coupling the cable to the vehicle floor at two spaced positions at opposite sides of the slidable connector to transmit a pull on the cable to the vehicle.

11. A passenger restraining system as in claim 10 in which the last mentioned means include two spaced guides through which the cable passes, the ends of the cable being secured to the seat at two different locations.

12. A passenger restraining system as in claim 11 in which the cable is secured at one end to the seat near the front and at the other end to the back of the seat behind the passenger.

13. A passenger restraining system as in claim 12 in which the seat has a folding back pivotally connected to the lower portion of the seat and said other end of the cable is connected to the back of the seat behind and above the pivotal connection.

14. A passenger restraining system as in claim 10 in which the strap means is also fastened to the seat in at least one location.

15. A passenger restraining system as in claim 10 in which the strap means is also fastened to the back of the seat rearwardly of and above one shoulder of the passenger.

16. A passenger restraining device as in claim 10 in which the seat back has a portion vertically adjustable relative to the passenger and the strap means is fastened to the vertically adjustable portion of the seat.

17. A passenger restraining device as in claim 16 in which the vertically adjustable portion of the seat includes a rigid base plate movable with and projecting laterally from the adjustable portion and anchor means for the strap means mounted on the laterally projecting portion of the base plate.

18. A passenger restraining system for a passenger seated in a seat mounted on the floor of a vehicle, comprising:
    strap means passing across the front of the seated passenger to restrain the passenger from movement out of the seat during rapid deceleration of the vehicle, said strap means including a continuous length of flexible strap extending diagonally across the torso of the passenger from the vicinity of one shoulder to a position beside a thigh of the passenger and then changing direction and returning across both thighs to the same side of the passenger as said one shoulder;
    and anchor means for the strap means, said anchor means including
    means fastening the upper end of said strap to the seat, and means coupling the strap means to the floor of the vehicle at both sides of the seat.

19. A passenger restraining system as in claim 18 in which the last mentioned means at one side of the seat includes
    a flexible cable,
    a connector movable along the cable connecting the strap means to the cable,
    and means securing the ends of the cable to the floor of the vericle at two spaced points.

20. A passenger restraining system as in claim 18 in which the last mentioned means at one side of the seat includes
    a flexible cable,
    a connector movable along the cable connecting the strap means to the cable, and
    two spaced guides mounted on the vehicle floor and through which the cable passes, the two ends of the cable being fastened to the seat at two spaced locations.

21. A passenger restraining system as in claim 18 in which the last mentioned means at one side of the seat includes
    a flexible cable,
    a connector movable along the cable connecting the strap means to the cable,
    two spaced guides mounted on the vehicle floor and through which the cable passes, the two ends of the cable being fastened to the seat at two spaced locations; and
    the last mentioned means at the other side of the seat includes means fastening the lower end of the strap to the vehicle floor at a fixed position.

22. A passenger restraining system as in claim 18 in which the last mentioned means at one side of the seat includes a hook engaging the continuous strap at the end of the diagonal run and changing the direction of the strap to extend across the thighs.

23. A passenger restraining system as in claim 18 in which the last mentioned means includes a releasable buckle having two separable parts of which one part is coupled in tension transmitting relation to the floor of the vehicle and the other part is slidably mounted on the continuous strap and effects a change in direction of the strap at the end of the lower end of the diagonal run.

24. The combination as in claim 18 in which the coupling means includes a pair of releasably connected elements of which one element has a flat, plate-like section in which a pair of slots are located,
    the continuous length of strap passing through the slots in the plate-like section to said change in direction, said section being slidable on the strap when the strap is relaxed but resisting deplacement on the strap when the strap is under tension.

25. The combination as in claim 18 in which the coupling means includes a pair of releasably connected elements of which one has a flattened rectangular tubular section through which the continuous length of strap passes, the strap making said change in direction adjacent the tubular section by bending away therefrom in the plane of the major dimension of the rectangular section.

26. A passenger restraining system as in claim 1 in which
    the strap means includes a continuous length of flexible strap extending from the vicinity of one shoulder at the first side of the passenger diagonally across the chest of the passenger to a location in the vicinity of the thigh at the opposite side of the passenger and then across the lap to the first side of the passenger; and
    the means connecting the strap means to the vehicle also includes a connection to the floor at said opposite side and means slidably engaging the continuous strap at the change in direction between the diagonal and lap-crossing runs of the strap.

27. A passenger restraining system as in claim 26 in which the last mentioned means is a hook-shaped member releasably engaging the continuous strap.

References Cited

UNITED STATES PATENTS

| | | | |
|---|---|---|---|
| 2,117,932 | 5/1938 | Anker | 397—216 |
| 2,789,831 | 4/1957 | Verik | 280—269 X |
| 3,028,200 | 4/1962 | Dye | 297—389 |
| 3,125,376 | 3/1964 | Duijuendijk et al. | 297—389 |
| 3,147,997 | 9/1964 | Mason | 297—396 X |
| 3,158,399 | 11/1964 | Pragnell | 297—389 |
| 3,357,736 | 12/1967 | McCarthy | 297—216 X |
| 3,385,633 | 5/1968 | Aizley | 297—389 |

JAMES T. McCALL, Primary Examiner

U.S. Cl. X.R.

280—150; 297—216